C. M. FRITZ.
WINDSHIELD.
APPLICATION FILED DEC. 31, 1920.
1,434,380. Patented Nov. 7, 1922.
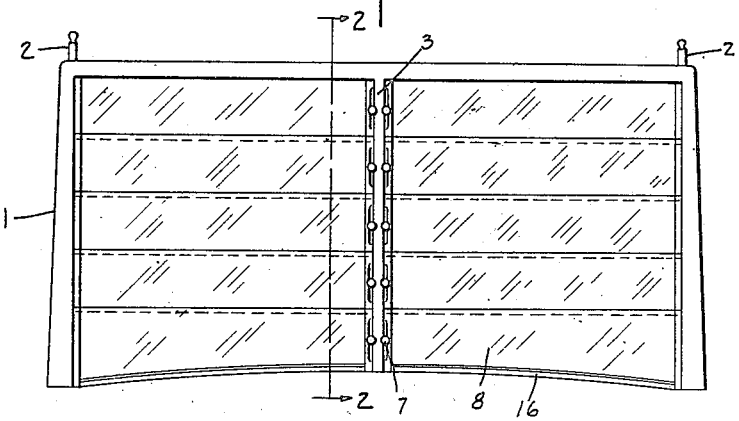
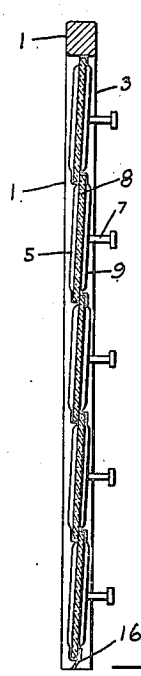
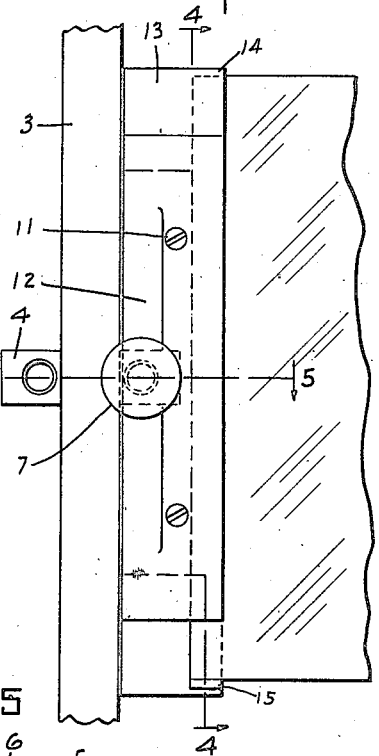
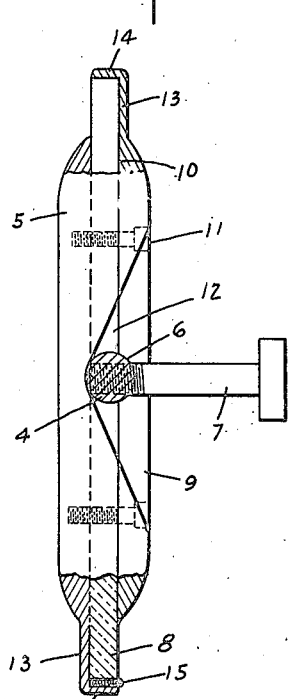
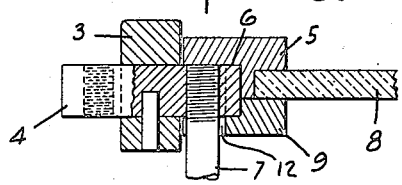
INVENTOR.
CARL M. FRITZ.
BY
ATTORNEY.

Patented Nov. 7, 1922.

1,434,380

UNITED STATES PATENT OFFICE.

CARL M. FRITZ, OF KOKOMO, INDIANA.

WINDSHIELD.

Application filed December 31, 1920. Serial No. 434,265.

*To all whom it may concern:*

Be it known that I, CARL M. FRITZ, a citizen of the United States, residing at Kokomo, in the county of Howard and State of Indiana, have invented certain new and useful Improvements in Windshields, of which the following is a specification.

This invention relates to wind shields and is an improvement over co-pending application, Serial No. 426,269, filed November 24, 1920, the prime feature of the present invention being the provision of a plurality of glass sections arranged in series and assembled together to form a complete wind shield when the sections are in closed position.

A further feature of the invention is the provision of a divisional post or bar preferably positioned at the longitudinal center of the wind shield frame so as to divide the shield into right and left sections.

A further feature of the invention is the provision of clamps for mounting the sections of glass in the wind shield frame, said clamps being arranged to remove or apply the glass without disassembling the parts of the wind shield.

A further feature of the invention is the provision of means, in connection with the clamps, for retaining bumpers in position for engagement with the edges of the adjacent glass sections to prevent any rattling of the sections during the travel of the automobile.

A further feature of the invention is the provision of means for rotatably mounting the clamps in the frame, means being provided for locking the sections in their adjusted positions, thereby providing ventilating openings or visual spaces through the wind shield.

Other objects and advantages will be hereinafter more fully set forth and pointed out in the accompanying specification.

In the accompanying drawings which are made a part of this application,

Figure 1 is an elevation of a wind shield ready to be applied to use,

Figure 2 is an enlarged sectional view thereof as seen on line 2—2 Figure 1,

Figure 3 is an enlarged detail sectional view showing the manner of securing the sections of glass to the divisional post, Figure 4 is a sectional view thereof as seen on line 4—4 Figure 3, and Figure 5 is a sectional view as seen on line 5—5 Figure 3.

Referring to the drawings in which similar reference numerals designate corresponding parts throughout the several views, 1 indicates a frame which may be constructed in any preferred manner and having the usual form of posts 2 thereon for supporting parts of an automobile top. Extending vertically of the frame 1 and preferably at the longitudinal center thereof is a bar 3, projecting from the opposite edges of which are bearing pins 4 on which are pivotally mounted clamps 5 having sockets 6 therein for the reception of the bearing pins. The clamps 5 are held in various adjusted positions by threading a bolt 7 through each bearing pin, the inner end of the bolt clamping against the adjacent portion of the socket 6 and thereby locking the clamps against further rotation.

The clamps 5 are adapted to engage the ends of the sections of glass 8 and in order to readily engage the sections of glass with the clamps without necessitating the removal of the clamps from engagement with the parts of the frame and bar, the clamps are preferably provided with a removable section 9, a channel 10 being provided for the reception of the end of the section of glass, one side wall of the channel being formed by the removable section 9. The removable section 9 is attached to the other section of the clamp in any suitable manner as by means of screws 11, and owing to the fact that the bolts 7 are stationary, the edges of the clamps 5 adjacent the bearing pins 4 are cut out to form recesses 12, the face walls of which flare thereby permitting the clamps, together with the sections of glass carried thereby, to have pivotal movement for a considerable distance in either direction.

The sections of glass 8 are prevented from leaving the clamps 5 by providing an extension 13 at one end of each section of the clamps, each extension having its free end 14 bent at right angles to pass over the edges of the section of glass 8, and as the top edge of each section 8 overlaps with the bottom edge of the next succeeding section, the upper end of each clamp 5 has its outer section terminating below the upper end of the inner section, consequently the meeting edges of the glass will rest in close proximity to each other, when in closed position, and prevent the passage of air or rain between the sections.

To prevent chattering or rattling of the sections of glass where they overlap each other, bumpers 15 are provided which preferably comprise strips of rubber, said bumpers being clamped between the lower right angular end 14 of the extensions 13 and projecting slightly beyond the edges of the sections 8, consequently the co-operating edge of the succeeding section will contact with the bumper when the sections are moved to closed position.

The lower set of sections 8 have a gasket 16 preferably of rubber clamped thereon in any suitable manner, said gasket resting on the hood or dash portion of the machine so as to exclude air, rain and the like at these points.

When the sections of glass are positioned as shown in Figures 1 and 2, a comparatively solid wind shield is provided the full width of the car, and although the meeting edges of the sections of glass overlap, yet the vision is not affected thereby.

It will further be seen that by providing the central bar, the sections of glass at one side of the machine may be opened while those at the opposite side may remain closed and that one of the sections of glass may be turned to open position and so adjusted that a visual space will be provided, although rain and snow will be excluded from the machine, this feature being of importance during a rain or snow storm.

It will further be seen that by forming the glass portion of the wind shield in sections, should one section become broken it can be very easily replaced with a new section and at a very nominal cost. When one of the sections of glass is to be turned from its normal position the bolt 7 co-operating with said section is loosened or turned outwardly, and when the section of glass has been pivoted to its proper position the bolt is again adjusted or turned inwardly, the inner end thereof binding against the adjacent portion of the clamp, and as the bearing pin 4, through which the bolt extends is stationary, the section of glass will be firmly held in its adjusted position.

The clamps 5 at the outer ends of the sections of glass are constructed the same as the clamps at the inner ends of the sections, except that the recesses 12 are omitted, but it will be clearly understood that the outer clamps may be provided with the channels and the co-operating locking bolts instead of the clamps at the inner ends of the sections of glass.

Having thus fully described my said invention, what I claim as new and desire to secure by Letters Patent, is:

1. In a wind shield a frame, a plurality of sections of transparent material, a two-part clamp at each end of each transparent section, means for locking the parts of the clamps together, extensions on said clamp sections having parts overlapping the edges of the transparent sections, and cushioning means entered between the edge of the transparent section and the extension on the clamp and in position for engagement with the overlapping part of the adjacent section.

2. The combination with a wind shield frame having a central bar, and bearing pins projecting through and beyond each face of said bar, of clamps having sockets for the reception of the projecting ends of said pins, the edges of said clamps adjacent said pins having cut out portions forming recesses, sections of glass supported by said clamps, and bolts threaded entirely through said pins and adapted to bind against the walls of said sockets for holding said glass sections in various adjusted positions, said bolts registering with said recesses.

3. In a wind shield, a frame, a plurality of sections of transparent material within said frame and having their meeting edges overlapping, a two-part clamp at each end of said transparent section, one part of the clamp being interiorly of the section and the other exteriorly thereof, the exterior part of the clamp terminating below the upper edge of the transparent section and the interior part terminating above the lower edge of the transparent section, right angular extensions at the upper end of the interior parts of the clamps and at the lower ends of the exterior parts, overlapping the respective edges of the transparent section, and cushioning means impinged between the right angular extension at the lower edge of the transparent section and said lower edge.

In witness whereof, I have hereunto set my hand and seal at Indianapolis, Indiana, this 18th day of December, A. D. nineteen hundred and twenty.

CARL M. FRITZ. [L. S.]

Witnesses:
CAREY S. FRYE,
M. L. SHULER.